US008055736B2

(12) United States Patent  (10) Patent No.: US 8,055,736 B2
Eisenhauer et al.  (45) Date of Patent: Nov. 8, 2011

(54) MAINTAINING STORAGE AREA NETWORK ('SAN') ACCESS RIGHTS DURING MIGRATION OF OPERATING SYSTEMS

(75) Inventors: Daniel G. Eisenhauer, Austin, TX (US); Robert G. Kovacs, Austin, TX (US); James A. Pafumi, Leander, TX (US); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 12/263,828

(22) Filed: Nov. 3, 2008

(65) Prior Publication Data
US 2010/0115131 A1  May 6, 2010

(51) Int. Cl.
*G06F 15/16* (2006.01)
*G06F 15/177* (2006.01)
*G06F 9/455* (2006.01)
*G06F 9/46* (2006.01)

(52) U.S. Cl. ............ 709/220; 709/219; 718/1; 718/100; 718/104

(58) Field of Classification Search ................... 711/114, 711/148, 153; 703/20, 23, 25; 709/245, 709/249, 250
See application file for complete search history.

(56) References Cited

U.S. PATENT DOCUMENTS
2005/0010688 A1* 1/2005 Murakami et al. ............ 709/245
(Continued)

FOREIGN PATENT DOCUMENTS
EP  1 380 947 A2  6/2003

OTHER PUBLICATIONS
PCT Search Report, Apr. 28, 2010; PCT Application No. PCT/EP2009/064271.
(Continued)

*Primary Examiner* — Joseph Avellino
*Assistant Examiner* — Aftab Nasir Khan
(74) *Attorney, Agent, or Firm* — Matthew B. Talpis; James L. Baudino

(57) ABSTRACT

Maintaining SAN access rights during migration of operating systems including assigning, to a virtual SAN interface adapter of a source virtualization intermediary (SVI') on the source server, at least two world wide port names (WWPN), identifying devices coupled for data communications to the SVI through the primary WWPN; selecting a target physical SAN interface adapter on a target server available to a target virtualization intermediary ('TVI') having a target virtual SAN interface adapter; assigning to the target virtual SAN interface adapter the secondary WWPN; identifying devices coupled for data communications to the TVI through the secondary WWPN; determining whether the devices coupled to the SVI through the primary WWPN are also coupled to TVI through the secondary WWPN; migrating the operating system from the source server to the target server if the devices coupled to the SVI through the primary WWPN are also coupled to TVI through the secondary WWPN.

18 Claims, 5 Drawing Sheets

U.S. PATENT DOCUMENTS

| | | |
|---|---|---|
| 2005/0114476 A1* | 5/2005 | Chen et al. .................... 709/220 |
| 2006/0041595 A1 | 2/2006 | Taguchi et al. |
| 2006/0064466 A1 | 3/2006 | Shiga et al. |
| 2006/0130052 A1 | 6/2006 | Allen et al. |
| 2007/0058619 A1* | 3/2007 | Gopal Gowda et al. ...... 370/386 |
| 2007/0112974 A1 | 5/2007 | Shirogane et al. |
| 2007/0147267 A1* | 6/2007 | Holland ........................ 370/252 |
| 2007/0220121 A1 | 9/2007 | Suwarna |
| 2007/0242617 A1* | 10/2007 | Ichimura ...................... 370/252 |
| 2007/0263637 A1 | 11/2007 | Madnani et al. |
| 2007/0283186 A1 | 12/2007 | Madnani et al. |
| 2008/0005507 A1 | 1/2008 | Madnani et al. |
| 2008/0126626 A1* | 5/2008 | Cashman et al. ............... 710/62 |
| 2008/0288627 A1* | 11/2008 | Hubis ........................... 709/223 |
| 2009/0025007 A1* | 1/2009 | Hara et al. .................... 718/105 |
| 2009/0138613 A1* | 5/2009 | Tanaka ......................... 709/230 |
| 2010/0030923 A1* | 2/2010 | Frazier et al. ................... 710/11 |
| 2010/0153612 A1* | 6/2010 | Zwisler et al. ................ 710/313 |

OTHER PUBLICATIONS

Blunden, et al. "Storage Networking Virtualization What's it all about?" IBM Redbooks, XX, XX, Dec. 1, 2000, XP002286341, p. 28, 88. First Edition, San Jose, CA, USA.

* cited by examiner

MAINTAINING STORAGE AREA NETWORK ('SAN') ACCESS RIGHTS DURING MIGRATION OF OPERATING SYSTEMS

BACKGROUND OF THE INVENTION

1. Field of the Invention

The field of the invention is data processing, or, more specifically, methods, apparatus, and products for maintaining storage area network ('SAN') access rights during migration.

2. Description of Related Art

There are a number of situations where operating system migration from a source computer to a destination computer is appropriate and commonly performed. If a system administrator is planning hardware maintenance on the source computer hardware, for example, the system administrator may migrate the operating system and its currently installed applications to another computer. Another situation where operating system migration is appropriate and often performed is when an operating system running one source computer has outgrown the physical resource limitations of that source computer's hardware and a system administrator may want to migrate to another computer whose hardware can accommodate the resource requirements.

Performing operating system migration poses a number of challenges when the operating system is operating as a component in a complex network, such as for example, a Storage Area Network ('SAN'). A SAN is a dedicated network that serves to interconnect storage-related resources available to one or more networked servers. A SAN is typically separate from local area networks ('LANs') and wide area networks ('WANs'). SANs are often characterized by high interconnection data rates between member storage peripherals. SANs are also often characterized by highly scalable architectures. SANs include both hardware and software for hardware management, monitoring, and configuration.

One reason operating system migration poses a challenge when the operating system to be migrated is connected to a SAN, is that SANs are typically 'zoned.' Zoning is a logical grouping of hosts and resources. A zoned operating system is only allowed access to storage devices within the operating system's zone. Zoning a SAN has a number of benefits including load balancing, dedication of storage capacity, data integrity, and security, as well as others that will occur to those of skill in the art.

One type of zoning that is commonly implemented with a SAN is logical unit masking ('LUN masking'). In LUN masking, each storage device is subdivided into logical units ('LUNs') and each storage device restricts operating systems access to one or more specific LUN. That is, an operating system is only allowed access to storage within these LUN.

Conventional operating system migration techniques require extensive reconfiguration of the SAN so the operating system can continue to access the same storage in the same LUNs after migration. There is therefore an ongoing need for methods, systems, and products useful in migrating an operating system from a source computer to a target computer that requires little or no reconfiguration of a storage area network.

SUMMARY OF THE INVENTION

Maintaining storage area network ('SAN') access rights during migration of operating systems across physically distinct servers including assigning, to a virtual SAN interface adapter of a source virtualization intermediary on the source server, at least two world wide port names, wherein the at least two world wide port names include a primary world wide port name and a secondary world wide port name; identifying devices coupled for data communications to the source virtualization intermediary through the primary world wide port name; selecting a target physical SAN interface adapter on a target server available to a target virtualization intermediary having a target virtual SAN interface adapter; assigning to the target virtual SAN interface adapter the secondary world wide port name; identifying devices coupled for data communications to the target virtualization intermediary through the secondary world wide port name; determining whether the devices coupled for data communications to the source virtualization intermediary through the primary world wide port name are also coupled for data communications to target virtualization intermediary through the secondary world wide port name; and migrating the operating system from the source server to the target server if the devices coupled for data communications to the source virtualization intermediary through the primary world wide port name are also coupled for data communications to target virtualization intermediary through the secondary world wide port name.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
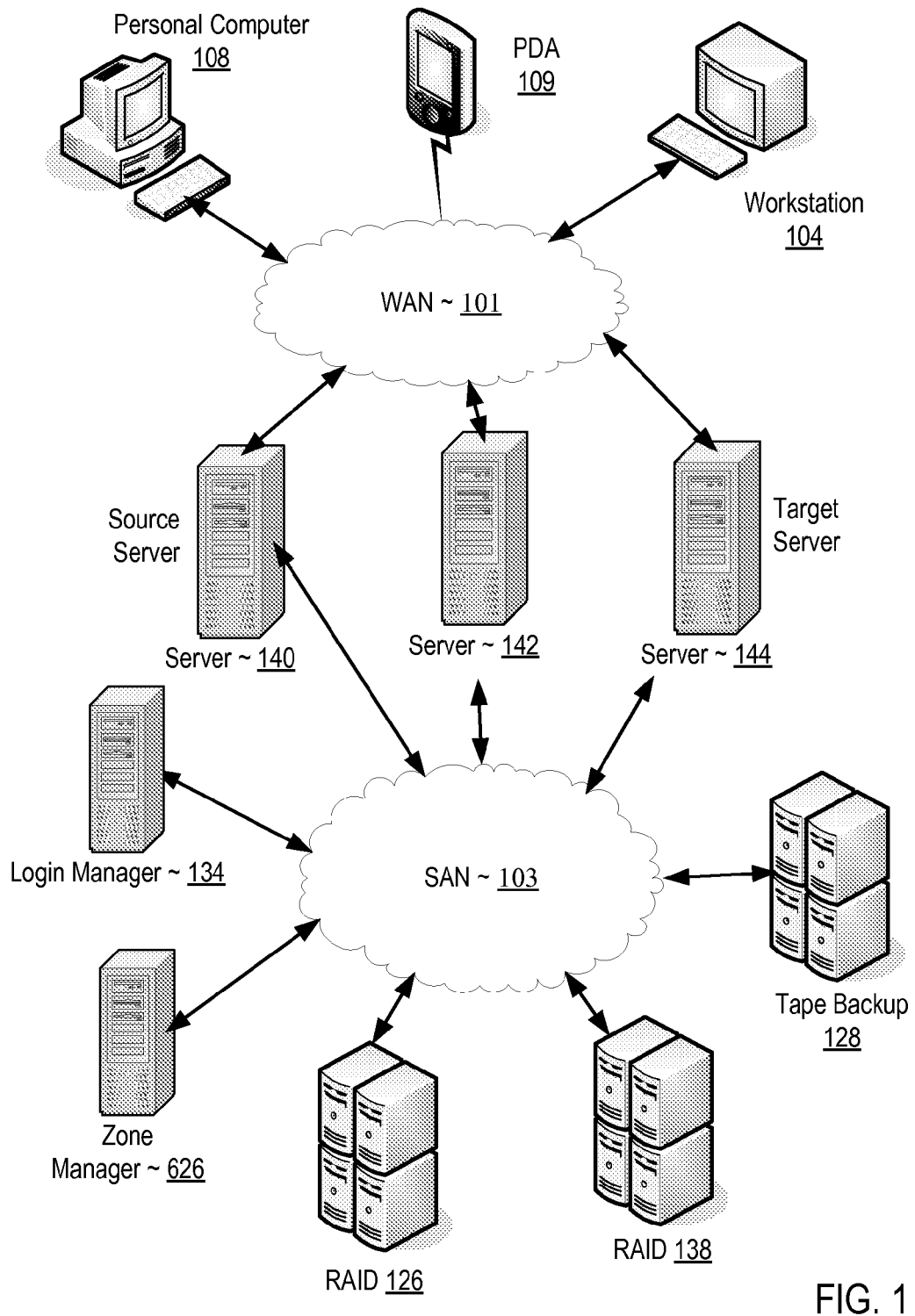
FIG. 1 depicts an exemplary data processing system capable of maintaining storage area network ('SAN') access rights during migration of operating systems across physically distinct servers.

Methods, systems, and products for maintaining storage area network ('SAN') access rights during migration of operating systems across physically distinct servers are now described with reference to the accompanying drawings, beginning with FIG. 1. FIG. 1 depicts an exemplary data processing system capable of maintaining storage area network ('SAN') access rights during migration of operating systems across physically distinct servers. The system of FIG. 1 includes a number of computers connected for data communications in networks.

The data processing system of FIG. 1 includes wide area network ("WAN") (101) and storage area network ("SAN")

(103). The network connection aspect of the architecture of FIG. 1 is only for explanation, not for limitation. In fact, systems for maintaining storage area network ('SAN') access rights according to embodiments of the present invention may also be connected as LANs, WANs, intranets, internets, the Internet, webs, the World Wide Web itself, or other connections as will occur to those of skill in the art. Such networks are media that may be used to provide data communication connections between various devices, computers, and computer storage connected together within an overall data processing system.

In the example of FIG. 1, several exemplary devices including a PDA (109), a computer workstation (104), a personal computer (108), and servers (140, 142, and 144) are connected to a WAN (101). In the example of FIG. 1, each of the servers (140, 142, and 144) connected to the WAN (101) may access a storage area network ('SAN') (103) that provides a number of storage devices. In the example of FIG. 1 two redundant arrays of independent disks ('RAIDs') (126 and 138) are connected to the SAN (103) through fiber optic connections. Redundant arrays of independent disks are disk drives that employ two or more drives in combination for improved fault tolerance and improved performance. In the example of FIG. 1, a tape backup (128) is also connected to the SAN (103) through a fiber optic connection.

In the example of FIG. 1, the SAN (103) is a Fibre Channel network. Fibre Channel is a protocol suite for transfer of data within a SAN. Fibre Channel is an architecture developed by a consortium of computer and mass storage device manufacturers currently being standardized by the American National Standards Institute ('ANSI'). Fibre Channel was designed for mass storage devices and other peripheral devices that require very high bandwidth. Using optical fiber to connect devices, Fibre Channel supports high data transfer rates. Interested readers may find additional information about Fibre Channel in the currently available Fibre Channel specification, which is ANSI document number ANSI/INCITS 373 entitled 'Information Technology-Fibre Channel Framing and Signaling Interface (FC-FS).'

While in this specification, methods, systems, and products for maintaining storage area network ('SAN') access rights during migration of operating systems across physically distinct servers are described with reference to Fibre Channel, this is for explanation and not for limitation. In fact, maintaining storage area network ('SAN') access rights may employ many different SAN technologies such as for example, InfiniBand®, iSCSI SAN, and others as will occur to those of skill in the art.

In the example of FIG. 1, a login manager (134) connects to the SAN (103) through a fiber optic link. The login manager (134) administers logging in adapters and logging off adapters with the SAN. The exemplary SAN of FIG. 1 also includes a zone manager (626) that implements zoning on the SAN by providing each operating system connected to the SAN access to that operating system's assigned storage devices.

To establish Fibre Channel connectivity, a world wide port name of a Fibre channel adapter must be associated with an N-Port ID. Each end point on the connection is called an N_Port (Node Port), which contains both an N_Port ID and a world wide port name. The N_Port ID of the destination port is the destination address of Fibre Channel frames sent to that port, and the N_Port ID of the source port is the source address. The world wide port name is a world wide unique identifier (analogous to MAC addresses in Ethernet) that can be queried by others in the SAN to determine the identity of that N_Port.

Conventional Fibre Channel adapters are assigned a burned-in world wide port name ('WWPN') that uniquely identifies the adapter and is used to establish Fibre Channel connectivity. These burned-in world wide port names are static and cannot be assigned to other adapters. N_Port ID Virtualization ('NPIV') however provides a Fibre Channel facility for assigning a virtual world wide port name to an adapter. NPIV allows a single fibre channel adapter to be assigned more than one virtual port name. NPIV also advantageously allows a single virtual port name to be moved from one source Fibre Channel adapter to another target Fibre Channel adapter.

While this specification describes an exemplary embodiment that uses a virtualization intermediary running directly in the source and targer servers, it is also applicable to other embodiments such as virtualization intermediaries implemented in the Fibre Channel adapter (such as HBA) or implemented in other entities between the server and the HBA. In fact, this invention may be useful with various configurations using NPIV for migration purposes.

In the example of FIG. 1 each of the servers (140, 142, and 144) has an operating system capable of migration to another of the servers (140, 142, and 144). The servers of FIG. 1 also include one or more logical partitions whose access to the SAN are provided by a source virtualization intermediary. A source virtualization intermediary allows partitions to share disk and network adapter resources. The source virtualization intermediary provides access to the physical SAN network adapters through a pair of virtual adapters in each of the logical partitions. One example of a source virtualization intermediary is a Virtual IO Server available from IBM®.

For ease of explanation, server (140) is labeled a source server and server (144) is labeled a target server. A source server in the example of FIG. 1 is a server having an operating system to be migrated to a target server in accordance with the present invention.

The system of FIG. 1 is capable of maintaining storage area network ('SAN') access rights during migration of operating systems across physically distinct servers (140, 142, and 144) by assigning, to a virtual SAN interface adapter of a source virtualization intermediary on the source server (140), at least two world wide port names, wherein the at least two world wide port names include a primary world wide port name and a secondary world wide port name; identifying devices coupled for data communications to the source virtualization intermediary through the primary world wide port name; selecting a target physical SAN interface adapter on a target server (144) available to a target virtualization intermediary having a target virtual SAN interface adapter; assigning to the target virtual SAN interface adapter the secondary world wide port name; identifying devices coupled for data communications to the target virtualization intermediary through the secondary world wide port name; determining whether the devices coupled for data communications to the source virtualization intermediary through the primary world wide port name are also coupled for data communications to target virtualization intermediary through the secondary world wide port name; and migrating the operating system from the source server to the target server if the devices coupled for data communications to the source virtualization intermediary through the primary world wide port name are also coupled for data communications to target virtualization intermediary through the secondary world wide port name, migrating the operating system from the source server to the target server. The system of FIG. 1 is also capable of selecting another target physical SAN interface adapter on another target server available to another target virtualization intermediary having another target virtual SAN interface adapter if the devices coupled for data communications to the source virtualization intermediary through the primary world wide port name are not also coupled for data communications to target virtualization intermediary through the secondary world wide port name.

The arrangement of devices making up the exemplary system illustrated in FIG. 1 are for explanation, not for limitation. Data processing systems useful according to various embodiments of the present invention may include additional servers, routers, other storage devices, and peer-to-peer architectures, not shown in FIG. 1, as will occur to those of skill in the art. Networks in such data processing systems may support many data communications protocols, including for example TCP/IP, HTTP, WAP, HDTP, Fibre Channel, Infini-Band, and others as will occur to those of skill in the art. Various embodiments of the present invention may be implemented on a variety of hardware platforms in addition to those illustrated in FIG. 1.

As mentioned above, maintaining storage area network ('SAN') access rights during migration of operating systems across physically distinct servers in accordance with the present invention is generally implemented with computers, that is, with automated computing machinery. For further explanation, FIG. 2 sets forth a block diagram of automated computing machinery comprising a server (140) useful in migrating an operating system from a source computer to a target computer according to embodiments of the present invention. The server (140) of FIG. 2 includes at least one computer processor (156) or 'CPU' as well as random access memory (168) ("RAM").

Figure 2:
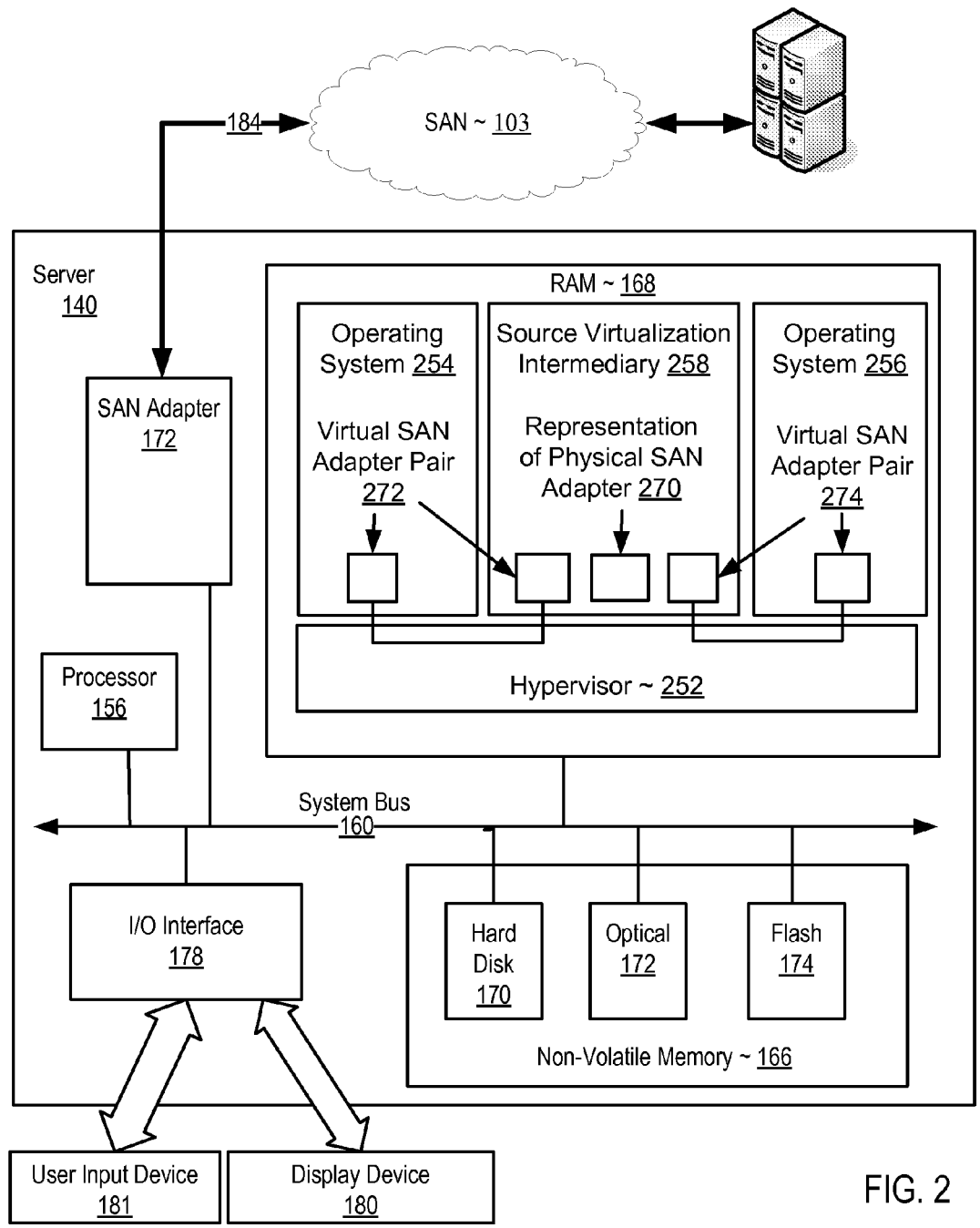
FIG. 2 sets forth a block diagram of automated computing machinery comprising a server useful in migrating an operating system from a source computer to a target computer according to embodiments of the present invention.

Stored in RAM (168) is a hypervisor (252). The hypervisor of FIG. 2 is a virtualization platform that allows multiple operating systems to run on the single server. In the example of FIG. 2, hypervisor (252) supports two operating systems (254 and 256). Operating systems useful in servers according to embodiments of the present invention include Unix, Linux, Windows NT™, i5/OS™, and many others as will occur to those of skill in the art. The operating systems (254 and 256) in the example of FIG. 2 are shown in RAM (168), but many components of an operating system typically are stored in non-volatile memory (166) also.

Also stored in RAM (168) is a source virtualization intermediary (258) The source virtualization intermediary of FIG. 2 allows partitions to share disk and network adapter resources. The source virtualization intermediary provides access to the physical SAN network adapters through a pair of virtual adapters (272 and 274) in each of the logical partitions. The source virtualization intermediary includes a representation (270) of the physical SAN adapter (172) for communications to each of the pair of virtual SAN adapters (272 and 274).

In the example of FIG. 2, each of the pair of virtual SAN interface adapters (272 and 274) maintained by source virtualization intermediary on the server (140) are assigned at least two world wide port names including a primary world wide port name and a secondary world wide port name. The source virtualization intermediary of FIG. 2 is capable of identifying devices, such as storage devices, coupled for data communications to the source virtualization intermediary through the primary world wide port name of each of the virtual SAN adapter pairs (272 and 274). The source virtualization intermediary of FIG. 2 is also capable of selecting a target physical SAN interface adapter on a target server (144) available to a target virtualization intermediary having a target virtual SAN interface adapter and providing to the target virtualization intermediary an identification of the devices that coupled for data communications to the source virtualization intermediary.

A target virtualization intermediary may then assign to a target virtual SAN interface adapter the secondary world wide port name and identify devices coupled for data communications to the target virtualization intermediary through the secondary world wide port name. The target virtualization intermediary is capable of determining whether the devices coupled for data communications to the source virtualization intermediary through the primary world wide port name are also coupled for data communications to target virtualization intermediary through the secondary world wide port name. That is, if the same devices are coupled for data communications to both the source virtualization intermediary and the target virtualization intermediary then the target server is an acceptable candidate to receive the operating system and maintaining SAN access rights according to the present invention includes migrating the operating system from the source server to the target server The server (140) of FIG. 2 includes non-volatile computer memory (166) coupled through a system bus (160) to processor (156) and to other components of the server. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary server (140) of FIG. 2 includes a physical SAN adapter (172) for implementing connections for data communications (184), including connections through networks, to the SAN (103), including other servers, clients, data storage in the SAN, and others as will occur to those of skill in the art. The SAN adapter implements the hardware level of connections for data communications through which local devices and remote devices or servers send data communications directly to one another and through networks. Examples of communications adapters useful as a SAN adapter according to embodiments of the present invention include Fibre Channel adapters and others as will occur to those of skill in the art.

The example server of FIG. 2 also includes one or more input/output interface adapters (178). Input/output interface adapters in servers implement user-oriented input/output through, for example, software drivers and computer hardware for controlling output to display devices (180) such as computer display screens, as well as user input from user input devices (181) such as keyboards and mice.

Figure 3:
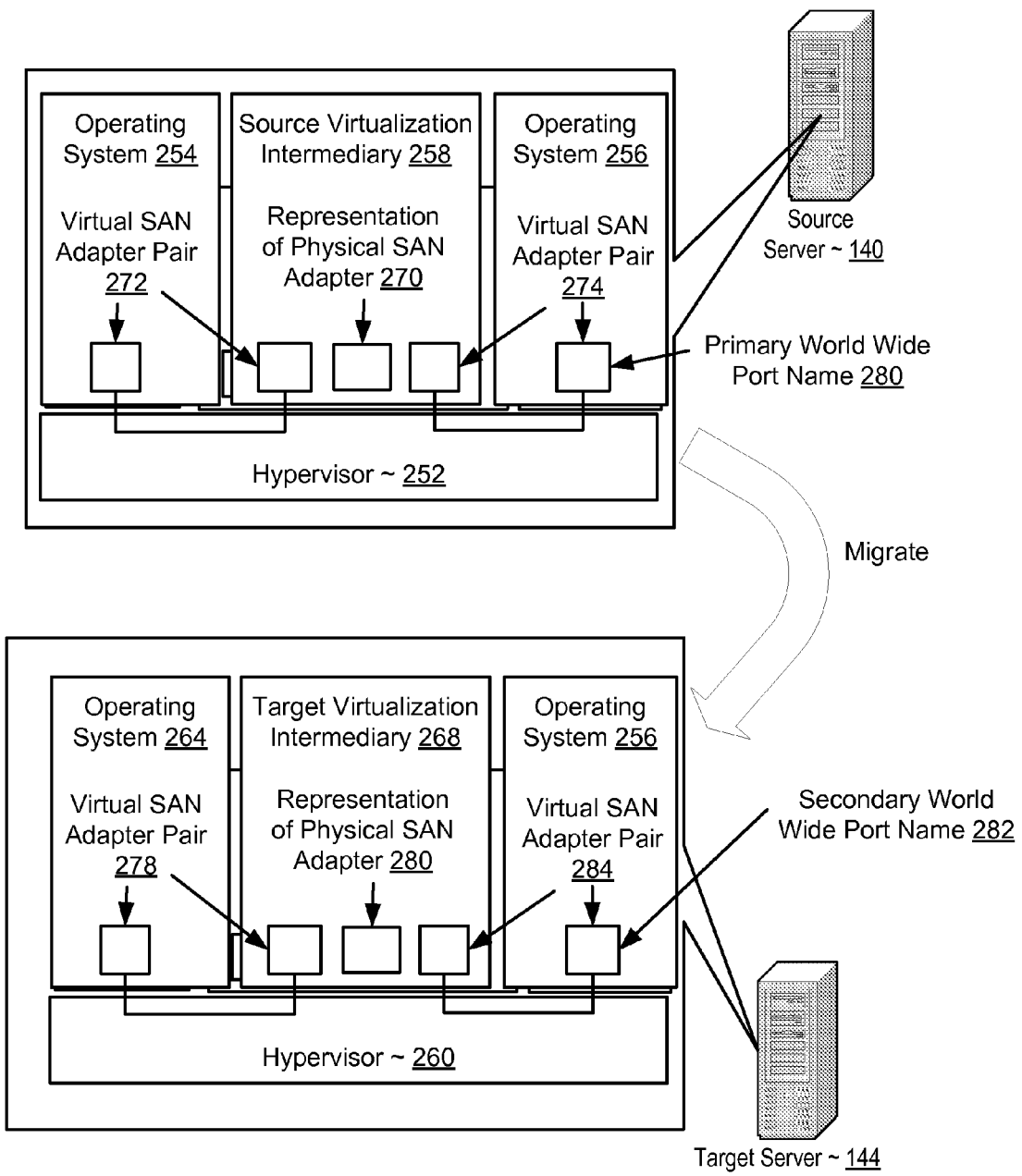
FIG. 3 sets forth a block diagram illustrating maintaining storage area network ('SAN') access rights during migration of operating systems across physically distinct servers according to the present invention.

For further explanation, FIG. 3 sets forth a block diagram illustrating maintaining storage area network ('SAN') access rights during migration of operating systems across physically distinct servers according to the present invention. In the example of FIG. 3, a source server has installed upon it two operating systems (254 and 256) and a source virtualization intermediary (258). The operating system (256) in the example of FIG. 3 is migrated from the source server (140) to the target server (144) while maintaining storage area network ('SAN') access rights according to the present invention. In the example of FIG. 3, prior to migration, the virtual SAN adapter pair (274) is assigned two world wide port names including a primary world wide port name (280) and a secondary world wide port name (282). In the example of FIG. 3, the source virtualization intermediary (258) identifies the devices coupled for data communications to the source virtualization intermediary (258) through the primary world wide port name (280). The source virtualization intermediary in the example of FIG. 3 then selects a target physical SAN interface adapter (280) on a target server (144) available to a target virtualization intermediary (268) having a target virtual SAN interface adapter (284) and provides to the target virtualization intermediary (268) identifications of the devices coupled to the source virtualization intermediary (258) and also provides the target virtualization intermediary with the secondary world wide port name (282).

In the example of FIG. 3, target virtualization intermediary (268) assigns to the target virtual SAN interface adapter (284) the secondary world wide port name (282) and identifies devices coupled for data communications to the target virtualization intermediary (268) through the secondary world wide port name (282). The target virtualization intermediary (268) in the example of FIG. 3 then determines whether the devices coupled for data communications to the source virtualization intermediary through the primary world wide port name are also coupled for data communications to target virtualization intermediary through the secondary world wide port name. That is, the target virtualization intermediary (268) determines that the same devices of interest are coupled to both the source virtualization intermediary (258) and the target virtualization intermediary (268). If the devices coupled for data communications to the source virtualization intermediary through the primary world wide port name are also coupled for data communications to target virtualization intermediary through the secondary world wide port name, and in the example of FIG. 3 they are, the operating system (256) is migrated from the source server (140) to the target server (144).

Figure 4:
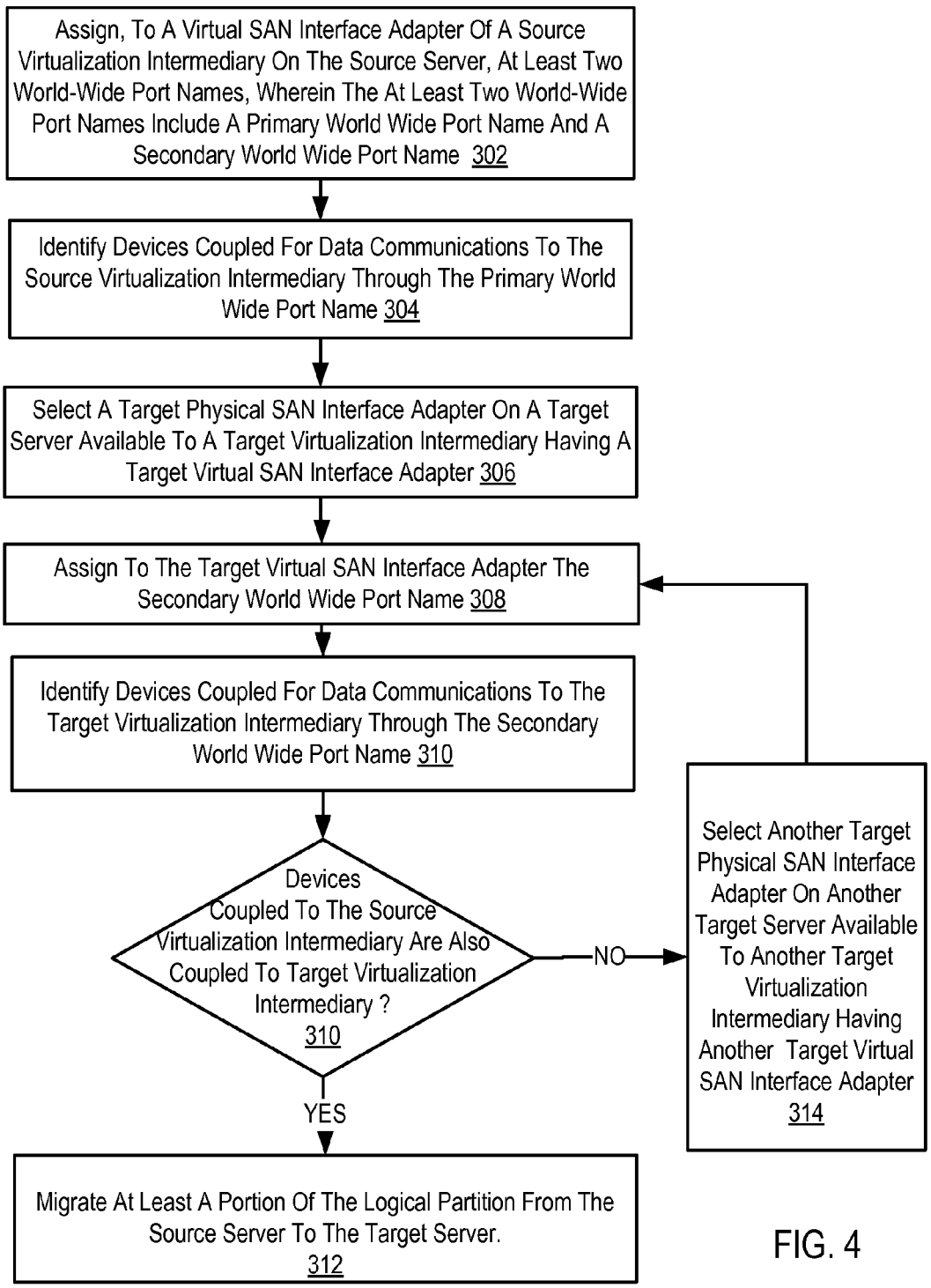
FIG. 4 sets forth a flow chart illustrating an exemplary method for maintaining storage area network access rights during migration of operating systems across physically distinct servers according to embodiments of the present invention.

For further explanation, FIG. 4 sets forth a flow chart illustrating an exemplary method for maintaining storage area network ('SAN') access rights during migration of operating systems across physically distinct servers according to embodiments of the present invention. The method of FIG. 4 includes assigning (302), to a virtual SAN interface adapter of a source virtualization intermediary on the source server, at least two world wide port names, wherein the at least two world wide port names include a primary world wide port name and a secondary world wide port name. The primary world wide port name is used to log the virtual SAN interface adapter providing the operating system to be migrated with communications to the SAN. The secondary world wide port name is used on the target server for maintaining storage area network ('SAN') access rights during migration as discussed in more detail below.

The method of FIG. 4 includes identifying (304) devices coupled for data communications to the source virtualization intermediary through the primary world wide port name. Identifying (304) devices coupled for data communications to the source virtualization intermediary through the primary world wide port name may be carried out by device discovery through the SAN. There are two basic methods of device discovery in Fibre Channel, for example, querying a name server for the SAN and polling all possible device addresses.

Figure 5:
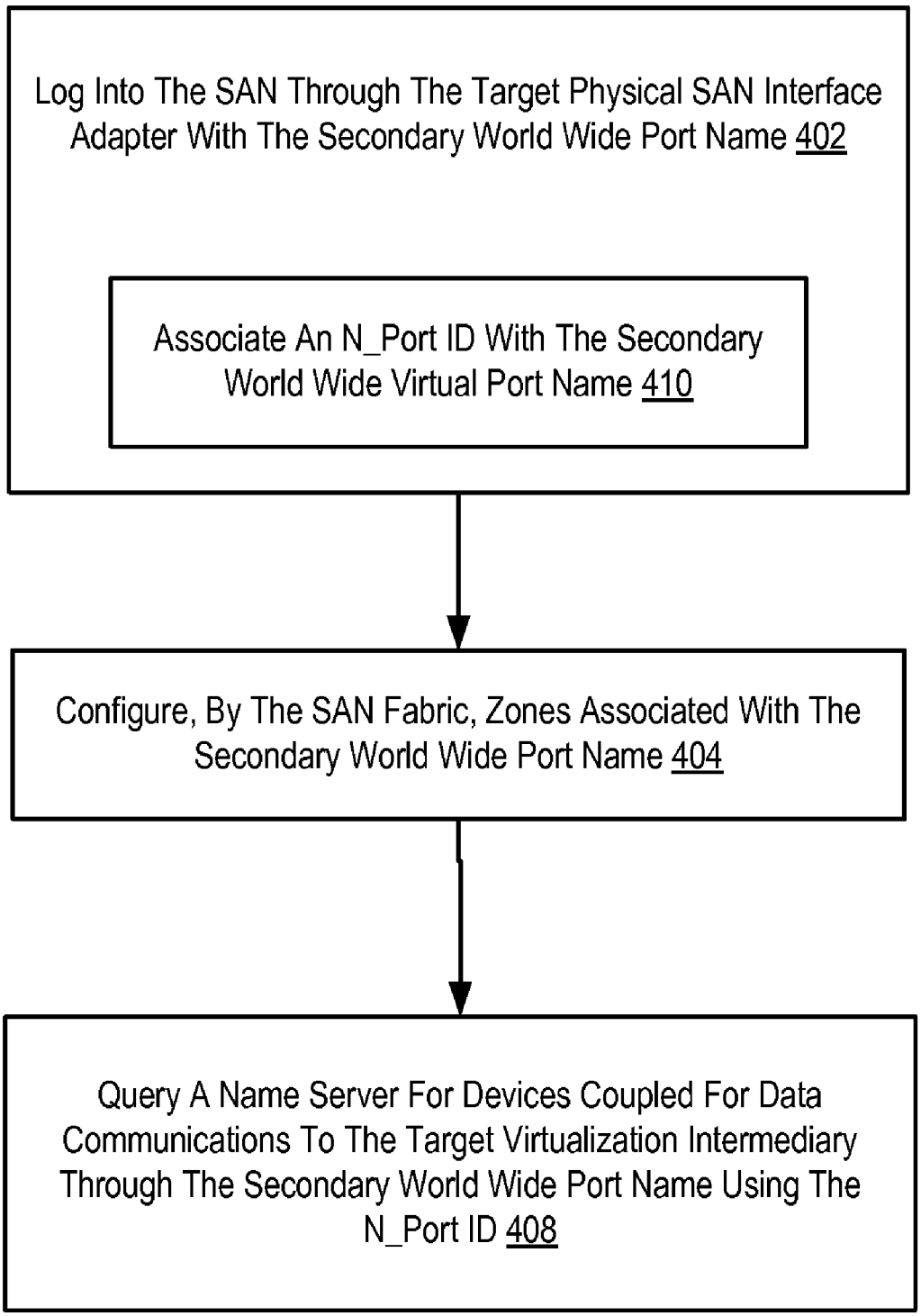
FIG. 5 sets forth a flow chart illustrating an exemplary method of identifying devices coupled for data communications to a target virtualization intermediary through the secondary world wide port name.

For further explanation, FIG. 5 sets forth a flow chart illustrating an exemplary method of identifying devices coupled for data communications to a target virtualization intermediary through the secondary world wide port name. The method of FIG. 5 includes logging (402) into the SAN through the target physical SAN interface adapter with the secondary world wide port name. Logging into the SAN through the target physical SAN interface adapter with the secondary world wide port name includes associating an N_Port ID with the secondary world wide virtual port name. Logging (402) into the SAN through the target physical SAN interface adapter with the secondary world wide port name may be carried out through a login manager. As mentioned above, a login manager administers logging in adapters and logging off adapters with the SAN.

The method of FIG. 5 includes configuring (404) zones associated with the secondary world wide port name. Configuring (404) zones associated with the secondary world wide port name may be carried out by a zone manager. As mentioned above, a zone manager implements zoning on the SAN by providing each operating system connected to the SAN access to that operating system's assigned storage devices.

The method of FIG. 5 includes querying (408) a name server for devices coupled for data communications to the target virtualization intermediary through the secondary world wide port name using the N_Port ID. In Fibre Channel, a name server is a logical database in each Fibre Channel switch that correlates devices N_Port ID and their world wide port names.

Returning to the example of FIG. 4: After identifying (304) devices coupled for data communications to the source virtualization intermediary through the primary world wide port name, the method of FIG. 4 also includes selecting (306) a target physical SAN interface adapter on a target server available to a target virtualization intermediary having a target virtual SAN interface adapter and assigning (308) to the target virtual SAN interface adapter the secondary world wide port name.

The method of FIG. 4 also includes identifying (310) devices coupled for data communications to the target virtualization intermediary through the secondary world wide port name. Identifying (310) devices coupled for data communications to the target virtualization intermediary through the secondary world wide port name may be carried out by device discovery through the SAN.

The method of FIG. 4 also includes determining (310) whether the devices coupled for data communications to the source virtualization intermediary through the primary world wide port name are also coupled for data communications to target virtualization intermediary through the secondary world wide port name. Determining (310) whether the devices coupled for data communications to the source virtualization intermediary through the primary world wide port name are also coupled for data communications to target virtualization intermediary through the secondary world wide port name may be carried out by comparing a list or other data structure containing the devices coupled to the source virtualization intermediary with the results of a device discovery carried out by the target virtualization intermediary.

If the devices coupled for data communications to the source virtualization intermediary through the primary world wide port name are also coupled for data communications to target virtualization intermediary through the secondary world wide port name, the method of FIG. 4 includes migrating (312) the operating system from the source server to the target server. As mentioned above, many source servers and target servers support more than one operating system in logical partitions. As such, migrating the operating system may include migrating the operating system image of a logical partition of the source server to the target server.

The method of FIG. 4 also includes selecting (314) another target physical SAN interface adapter on another target server available to another target virtualization intermediary having another target virtual SAN interface adapter if the devices coupled for data communications to the source virtualization intermediary through the primary world wide port name are not also coupled for data communications to target virtualization intermediary through the secondary world wide port name. The method of FIG. 4 may continue until a target server is selected such that the devices coupled for data communications to the source virtualization intermediary through the primary world wide port name are also coupled for data communications to target virtualization intermediary through the secondary world wide port name.

Exemplary embodiments of the present invention are described largely in the context of a fully functional computer system for maintaining storage area network ('SAN') access rights during migration of operating systems across physically distinct servers. Readers of skill in the art will recognize, however, that the present invention also may be embodied in a computer program product disposed on computer readable media for use with any suitable data processing system. Such media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of maintaining storage area network ('SAN') access rights during migration of an operating system between a source server and a physically distinct target server connected to the SAN across physically distinct servers, the method comprising:
   identifying a virtual SAN interface adapter of a source virtualization intermediary on the source server with a primary world wide port name and a secondary world wide port name;
   identifying devices coupled for data communications to the source virtualization intermediary through the primary world wide port name;
   selecting a target physical SAN interface adapter on a target server available to a target virtualization intermediary having a target virtual SAN interface adapter and providing the target virtualization intermediary with the secondary world wide port name;
   assigning to the target virtual SAN interface adapter the secondary world wide port name;
   identifying devices coupled for data communications to the target virtualization intermediary through the secondary world wide port name; and
   responsive to determining that the devices coupled for data communications to the source virtualization intermediary through the primary world wide port name are coupled for data communications to the target virtualization intermediary through the secondary world wide port name, migrating the operating system from the source server to the target server.

2. The method of claim 1 further comprising selecting another target physical SAN interface adapter on another target server available to another target virtualization intermediary having another target virtual SAN interface adapter if the devices coupled for data communications to the source virtualization intermediary through the primary world wide port name are not also coupled for data communications to target virtualization intermediary through the secondary world wide port name.

3. The method of claim 1 wherein migrating the operating system further comprises migrating the operating system image of a logical partition of the source server to the target server.

4. The method of claim 1 wherein the SAN comprises a Fibre Channel storage area network.

5. The method of claim 1 wherein identifying devices coupled for data communications to a target virtualization intermediary through the secondary world wide port name comprises:
   logging into the SAN through the target physical SAN interface adapter with the secondary world wide port name;
   configuring zones associated with the secondary world wide port name; and
   querying a name server for devices coupled for data communications to the target virtualization intermediary through the secondary world wide port name using the N_PortID.

6. The method of claim 5 wherein logging into the SAN through the target physical SAN interface adapter with the secondary world wide port name further comprises associating an N_Port ID with the secondary world wide virtual port name.

7. A system for maintaining storage area network ('SAN') access rights during migration of an operating system between a source server and a physically distinct target server connected to the SAN, the system comprising a source server and a target server, the source server comprising a computer processor and a computer memory operatively coupled to the computer processor, the target server comprising a computer processor and a computer memory operatively coupled to the computer processor, the computer memory of the source server and the target server having disposed within them computer program instructions capable of:
   identifying a virtual SAN interface adapter of a source virtualization intermediary on the source server with a primary world wide port name and a secondary world wide port name;
   identifying devices coupled for data communications to the source virtualization intermediary through the primary world wide port name;
   selecting a target physical SAN interface adapter on a target server available to a target virtualization intermediary having a target virtual SAN interface adapter and providing the target virtualization intermediary with the secondary world wide port name;
   assigning to the target virtual SAN interface adapter the secondary world wide port name;

identifying devices coupled for data communications to the target virtualization intermediary through the secondary world wide port name; and responsive to determining that the devices coupled for data communications to the source virtualization intermediary through the primary world wide port name are coupled for data communications to the target virtualization intermediary through the secondary world wide port name, migrating the operating system from the source server to the target server.

8. The system of claim 7 further comprising computer program instructions capable of selecting another target physical SAN interface adapter on another target server available to another target virtualization intermediary having another target virtual SAN interface adapter if the devices coupled for data communications to the source virtualization intermediary through the primary world wide port name are not also coupled for data communications to target virtualization intermediary through the secondary world wide port name.

9. The system of claim 7 wherein computer program instructions capable of migrating the operating system further comprise computer program instructions capable of migrating the operating system image of a logical partition of the source server to the target server.

10. The system of claim 7 wherein the SAN comprises a Fibre Channel storage area network.

11. The system of claim 7 wherein the computer program instructions capable of identifying devices coupled for data communications to a target virtualization intermediary through the secondary world wide port name comprise computer program instructions capable of:

logging into the SAN through the target physical SAN interface adapter with the secondary world wide port name;

configuring zones associated with the secondary world wide port name; and querying a name server for devices coupled for data communications to the target virtualization intermediary through the secondary world wide port name using the N_PortID.

12. The system of claim 11 wherein computer program instructions capable of logging into the SAN through the target physical SAN interface adapter with the secondary world wide port name further comprise computer program instructions capable of associating an N_Port ID with the secondary world wide virtual port name.

13. A computer program product for maintaining storage area network ('SAN') access rights during migration of an operating system between a source server and a physically distinct target server connected to the SAN, the computer program product disposed in a recordable computer readable storage medium, the computer program product comprising computer program instructions for:

identifying a virtual SAN interface adapter of a source virtualization intermediary on the source server with a primary world wide port name and a secondary world wide port name;

identifying devices coupled for data communications to the source virtualization intermediary through the primary world wide port name;

selecting a target physical SAN interface adapter on a target server available to a target virtualization intermediary having a target virtual SAN interface adapter and providing the target virtualization intermediary with the secondary world wide port name;

assigning to the target virtual SAN interface adapter the secondary world wide port name;

identifying devices coupled for data communications to the target virtualization intermediary through the secondary world wide port name; and responsive to determining that the devices coupled for data communications to the source virtualization intermediary through the primary world wide port name are coupled for data communications to the target virtualization intermediary through the secondary world wide port name, migrating the operating system from the source server to the target server.

14. The computer program product of claim 13 wherein computer program instructions for logging into the SAN through the target physical SAN interface adapter with the secondary world wide port name further comprise computer program instructions for associating an N_Port ID with the secondary world wide virtual port name.

15. The computer program product of claim 13 wherein computer program instructions for migrating the operating system further comprise computer program instructions for migrating the operating system image of a logical partition of the source server to the target server.

16. The computer program product of claim 13 wherein the SAN comprises a Fibre Channel storage area network.

17. The computer program product of claim 13 further comprising computer program instructions for selecting another target physical SAN interface adapter on another target server available to another target virtualization intermediary having another target virtual SAN interface adapter if the devices coupled for data communications to the source virtualization intermediary through the primary world wide port name are not also coupled for data communications to target virtualization intermediary through the secondary world wide port name.

18. The computer program product of claim 17 wherein computer program instructions for identifying devices coupled for data communications to a target virtualization intermediary through the secondary world wide port name comprise computer program instructions for:

logging into the SAN through the target physical SAN interface adapter with the secondary world wide port name;

configuring zones associated with the secondary world wide port name; and querying a name server for devices coupled for data communications to the target virtualization intermediary through the secondary world wide port name using the N_PortID.

* * * * *